United States Patent Office

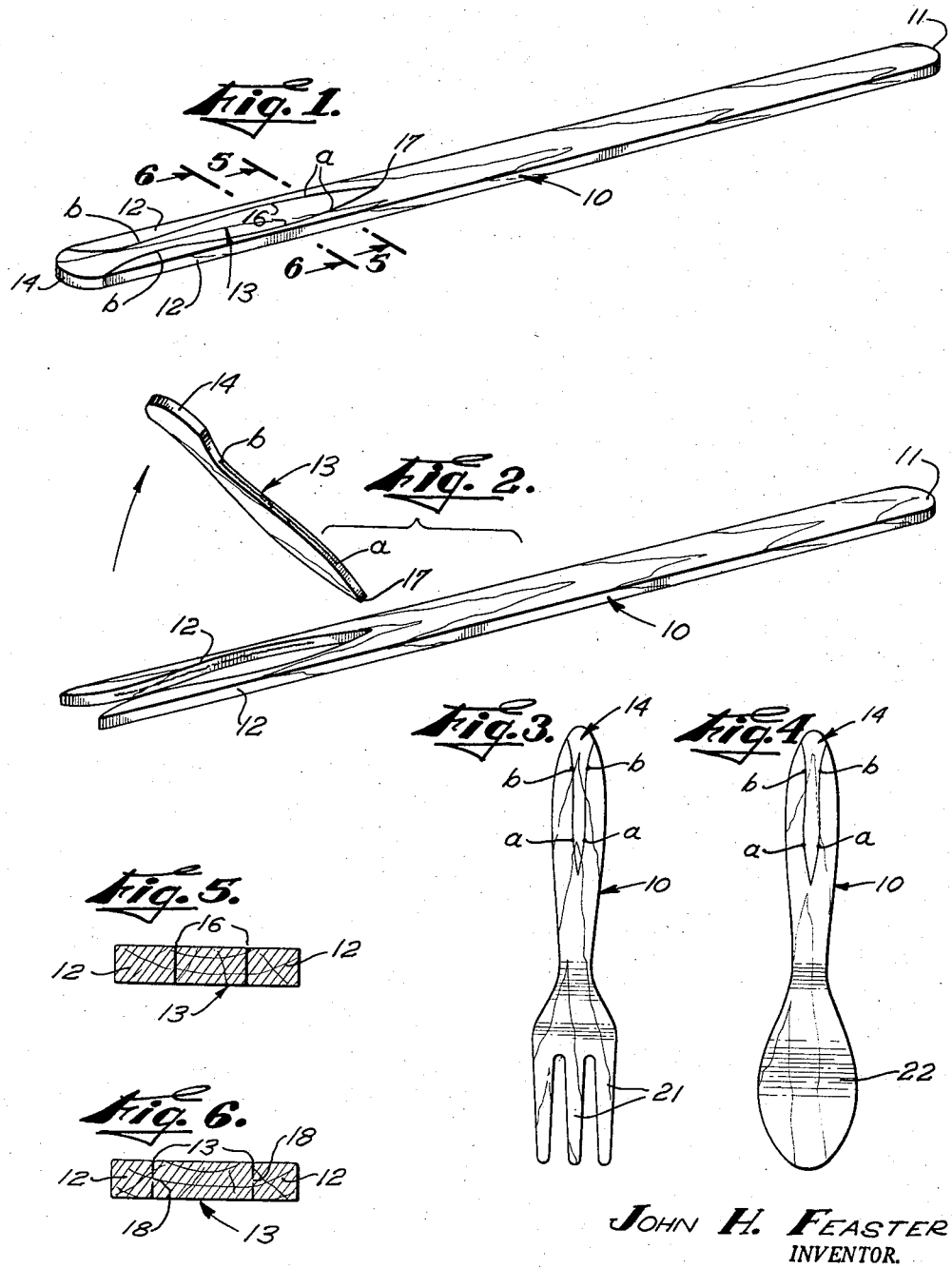

2,877,547
Patented Mar. 17, 1959

2,877,547

COMBINATION TOOTHPICK AND STIRRING OR EATING IMPLEMENT

John H. Feaster, Orange, Calif.

Application January 23, 1957, Serial No. 635,664

2 Claims. (Cl. 30—1)

This invention relates to implements or articles used for eating and related purposes. More particularly, the invention relates to a combination toothpick and stirring or eating implement.

Millions of disposable coffee stirrers, spoons and forks, etc., are dispensed or vended at eating establishments each year, particularly at drive-in restaurants. Such establishments conventionally make available to the customer, as an entirely separate item, a suitable toothpick which may or may not be stored or dispensed in a sanitary condition. The dispensing of toothpicks by the managers of an eating establishment, and free of charge, is not only a nuisance but may amount to a substantial item of expense over a period of time.

An object of the present invention is to provide a combination device which is usable either as a toothpick or an eating implement, and which is so constructed that the functions of each portion of the device do not impair the functions of the other portion thereof.

A further object is to provide a combination toothpick and eating implement which may be manufactured with very little increase in cost over that of the eating implement alone.

An additional object is to provide a combination toothpick and eating implement which is so constructed that the toothpick portion may be removed from the remaining portion with very little effort and without impairing the shape of the working or pointed end of the toothpick portion.

An additional object is to provide a combination toothpick and eating implement which may be separated into its component parts with a minimum of effort, and with minimum damage to the components, yet which will maintain its assembled condition until separation is desired.

These and other objects and advantages of the invention will be more fully set forth in the following specification and claims, which are to be considered in connection with the attached drawing to which they relate.

In the drawing:

Figure 1 is a perspective view illustrating a combination toothpick and coffee stirrer or paddle, constructed in accordance with the present invention;

Figure 2 illustrates the device of Figure 1 but in a disassembled condition;

Figures 3 and 4 illustrate, respectively, a combination toothpick and fork, and a combination toothpick and spoon;

Figure 5 is an enlarged transverse sectional view on line 5—5 of Figure 1; and

Figure 6 is an enlarged transverse sectional view on line 6—6 of Figure 1.

Referring to Figures 1 and 2 of the drawing, the combination toothpick and stirring or eating implement is illustrated to comprise a relatively long and narrow body or handle portion 10, which is rounded at one end as indicated at 11, and is formed integral with tines or prongs 12 at the other end. Mounted between the prongs 12 is a toothpick portion 13 having a rounded outer end 14 remote from end 11 of the body or handle portion. The body portion 10, tines or prongs 12, and toothpick portion 13 are disposed in a common plane and are constructed complementary to each other in such manner that when assembled, as illustrated in Figure 1, they combine to form a substantially continuous article similar to a conventional coffee stirrer or paddle. The portions 10, 12, and 13 are preferably formed of wood and are of a single relatively small thickness.

Toothpick portion 13 is relatively long and thin, being separated from the tines or prongs 12 by separation lines 16 of shallow S-shape. The lines 16 are symmetrical about the longitudinal axis of the device and meet at a relatively sharp apex 17 located remote from the rounded or paddle-shaped end 14. It is this apex 17 which serves as the point of the toothpick upon disassembly of toothpick portion 13 from prongs 12, as illustrated in Figure 2.

The formation of the lines of separation 16 is important to the invention, and will next be described. The portions thereof between apex 17 and the points indicated at "a" in the drawing are completely machine-severed to provide extremely narrow slots as indicated in Figure 5. The same is true of the portions of separation lines 16 between end 14 and the points "b." Between points "a" and "b," the lines of separation 16 are not completely cut or severed, but instead are left as opposed grooves separated by a thin central supporting portion 18 (Figure 6) which performs the function of maintaining the toothpick portion 13 and tines 12 in assembled condition until separation is desired.

The combination toothpick and stirring or eating implement may be readily cut from flat wooden blanks, the dies being so set and shaped that the lines of separation 16 are formed at the same time that the sides of the device are cut out. The combination device is then, preferably, wrapped in a sanitary paper covering and is dispensed or vended with food, coffee, or the like. The toothpick portion 13 is maintained integral with tine portions 12 (Figure 1) due to the presence of the support portions 18, and also because of the fact that the narrow or constricted throat between point "b" prevents axial outward shifting of the toothpick portion.

If coffee or the like is to be stirred, the handle portion 10 is grasped and the assembled toothpick portion 13 and tines 12 are inserted into the drink for stirring purposes. Alternatively, the end 11 may be used for stirring and the other end held by the hand.

When it is desired to provide a toothpick, the paddle end 14 is grasped between two fingers and twisted or bent slightly, in order to sever the support portions 18. Toothpick portion 13 is then readily removed from between tines 12, and without injury to the point or apex 17. A highly attractive and useful toothpick is thus provided. Furthermore, the ends of the tines 12 are maintained uninjured (due to the completely severed adjacent portions of lines 16), so that the remaining device may be used as a pickle fork or the like.

Figures 3 and 4 illustrate applications of the invention to the handle portions of a fork and spoon, respectively. These handle portions are formed in a single plane. The construction and operation of these embodiments is identical to that previously described, in connection with Figures 1–2 and 5–6, except that tines 21 and a bowl 22 are provided at the ends of the devices remote from the toothpick portions 14.

Various embodiments of the present invention, in addition to what has been illustrated and described in detail, may be employed without departing from the scope of the accompanying claims.

I claim:

1. A beverage-stirring means adapted to be manually divided into a fork and a toothpick, which comprises a relatively thin elongated narrow one-piece body portion which lies in a single plane, said body having two narrow grooves shaped as shallow S-shaped curves and formed therein from one end thereof to a central point spaced a substantial distance from said one end, the portions of said grooves adjacent said point extending clear through said body to form slots, said grooves being separated at said one end and converging gradually therefrom to said point, said grooves being sufficiently deep and continuous to permit simple manual separation of the end portion between said grooves from the remainder of said body and thus result in conversion of the stirring means into a fork and a toothpick.

2. A beverage-stirring means adapted to be manually divided into a fork and a toothpick, which comprises a relatively thin elongated narrow one-piece body portion which lies in a single plane, said body being formed of wood and having parallel sides and rounded ends, said body having two narrow grooves formed therein from one end thereof to a central point spaced a substantial distance from said one end, said grooves being separated at said one end and converging gradually therefrom to said point, said grooves being sufficiently deep and continuous to permit simple manual separation of the end portion between said grooves from the remainder of said body and thus result in conversion of the stirring means into a fork and a toothpick.

References Cited in the file of this patent

UNITED STATES PATENTS

| | | |
|---|---|---|
| 910,914 | Daly et al. | Jan. 26, 1909 |
| 2,216,005 | Goldstein | Sept. 24, 1940 |
| 2,762,501 | Cameron | Sept. 11, 1956 |

FOREIGN PATENTS

| | | |
|---|---|---|
| 38,380 | Sweden | Feb. 17, 1915 |